United States Patent
Butera et al.

(10) Patent No.: US 9,254,060 B2
(45) Date of Patent: Feb. 9, 2016

(54) MULTI-BEVERAGE VENDING MACHINE

(71) Applicant: SAES GETTERS S.P.A., Lainate (IT)

(72) Inventors: Francesco Butera, Como (IT); Stefano Alacqua, Como (IT); Emanuele Nicolini, Oleggio (IT)

(73) Assignee: SAES GETTERS S.P.A., Lainate (MI) (IT)

( * ) Notice: Subject to any disclaimer, the term of this patent is extended or adjusted under 35 U.S.C. 154(b) by 0 days.

(21) Appl. No.: 13/877,406

(22) PCT Filed: Nov. 16, 2012

(86) PCT No.: PCT/IB2012/056492
§ 371 (c)(1),
(2) Date: Apr. 2, 2013

(87) PCT Pub. No.: WO2013/076634
PCT Pub. Date: May 30, 2013

(65) Prior Publication Data
US 2014/0183220 A1    Jul. 3, 2014

(30) Foreign Application Priority Data
Nov. 22, 2011   (IT) .............................. MI2011A2121

(51) Int. Cl.
*B67D 1/00*     (2006.01)
*A47J 31/56*    (2006.01)
(Continued)

(52) U.S. Cl.
CPC  *A47J 31/56* (2013.01); *A47J 31/46* (2013.01); *A47J 31/542* (2013.01); *F24H 1/101* (2013.01); *F24D 2220/0257* (2013.01)

(58) Field of Classification Search
CPC .................... F03G 7/065; F24D 17/00; F24D 19/1006–19/1051; E03B 7/04–7/045; A47J 31/00–31/605
USPC ..................... 222/54, 146.1, 146.2, 518, 485; 137/468, 625.4, 337; 251/11, 336–338; 236/93 R, 101 R, 101 D, 103; 99/323.3, 99/281
See application file for complete search history.

(56) References Cited

U.S. PATENT DOCUMENTS 1,150,522 A * 8/1915 Jackson et al. ................. 165/155
2,842,155 A * 7/1958 Peters ........................... 137/337
(Continued)

FOREIGN PATENT DOCUMENTS

EP  0307955   3/1989
EP  2050372   4/2009
(Continued)

OTHER PUBLICATIONS

JP2005316560MT, Kimimichi Kuboyama, Machine Translation of JP 2005316560, Apr. 27, 2004.*
(Continued)

*Primary Examiner* — Patrick M Buechner
*Assistant Examiner* — Randall Gruby
(74) *Attorney, Agent, or Firm* — Steinfl & Bruno LLP

(57) ABSTRACT

An instant drink vending machine is described. The instant drink vending machine has a water supply system for obtaining mixed warm water with a temperature selected among a set of pre-determined temperatures comprised between an upper and a lower value corresponding to temperatures of hot water and cold water to be mixed, said system including thermostatic shape memory alloy devices.

14 Claims, 4 Drawing Sheets

Figure 1:
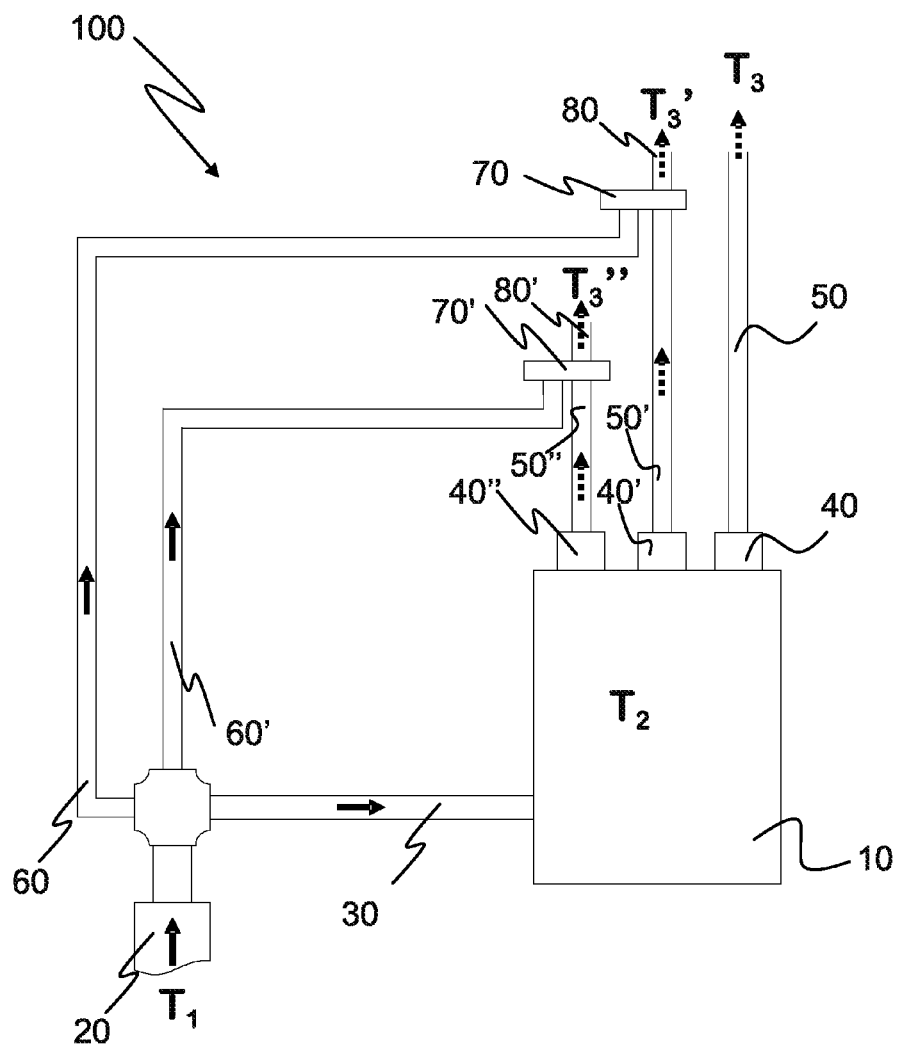

(51) Int. Cl.
  *A47J 31/46* (2006.01)
  *A47J 31/54* (2006.01)
  *F24H 1/10* (2006.01)

(56) References Cited

U.S. PATENT DOCUMENTS

| | | | | |
|---|---|---|---|---|
| 3,090,559 A * | 5/1963 | Bayer | | 236/12.16 |
| 3,388,861 A * | 6/1968 | Harding | | 236/12.2 |
| 3,613,732 A * | 10/1971 | Willson et al. | | 137/625.44 |
| 3,664,582 A * | 5/1972 | Willson et al. | | 236/93 R |
| 3,685,728 A * | 8/1972 | Chapou | | 236/12.2 |
| 3,741,195 A * | 6/1973 | Ellis | | 4/638 |
| 3,748,197 A * | 7/1973 | Willson et al. | | 148/563 |
| 3,974,844 A * | 8/1976 | Pimentel | | 137/1 |
| 4,142,515 A * | 3/1979 | Skaats | | 122/13.3 |
| 4,144,057 A | 3/1979 | Melton et al. | | |
| 4,201,518 A * | 5/1980 | Stevenson | | 417/12 |
| 4,321,943 A * | 3/1982 | Haws | | 137/337 |
| 4,331,292 A * | 5/1982 | Zimmer | | 237/19 |
| 4,570,851 A * | 2/1986 | Cirillo | | 236/93 R |
| 4,760,953 A * | 8/1988 | Trubert | | 236/12.2 |
| 4,899,543 A * | 2/1990 | Romanelli et al. | | 60/527 |
| 4,930,551 A * | 6/1990 | Haws | | 137/337 |
| 4,936,289 A * | 6/1990 | Peterson | | 122/13.3 |
| 5,079,920 A * | 1/1992 | Whitehead et al. | | 60/527 |
| 5,158,793 A * | 10/1992 | Helbling | | 426/231 |
| 5,183,029 A * | 2/1993 | Ranger | | 122/13.3 |
| 5,211,371 A * | 5/1993 | Coffee | | 251/11 |
| 5,261,597 A * | 11/1993 | Perlman et al. | | 236/93 R |
| 5,511,723 A * | 4/1996 | Eki et al. | | 236/12.12 |
| 5,579,992 A * | 12/1996 | Masatoshi et al. | | 236/12.21 |
| 5,580,240 A * | 12/1996 | Hattori | | 431/344 |
| 5,622,203 A * | 4/1997 | Givler et al. | | 137/337 |
| 5,623,990 A * | 4/1997 | Pirkle | | 165/298 |
| 5,647,530 A * | 7/1997 | Lorch | | 236/12.14 |
| 5,701,387 A * | 12/1997 | McGugan | | 392/456 |
| 5,791,557 A * | 8/1998 | Kunze | | 236/34.5 |
| 5,803,354 A * | 9/1998 | Benedict | | 236/12.2 |
| 5,873,904 A * | 2/1999 | Ragheb et al. | | 623/1.13 |
| 5,878,949 A * | 3/1999 | Matsui et al. | | 236/93 R |
| 5,967,409 A * | 10/1999 | Benedict | | 236/92 R |
| 5,984,195 A * | 11/1999 | Benedict | | 236/12.2 |
| 6,082,624 A * | 7/2000 | Heinzelmann et al. | | 236/93 B |
| 6,224,755 B1 * | 5/2001 | Schamberg et al. | | 210/149 |
| 6,247,678 B1 * | 6/2001 | Hines et al. | | 251/11 |
| 6,253,837 B1 * | 7/2001 | Seiler et al. | | 165/103 |
| 6,286,464 B1 * | 9/2001 | Abraham et al. | | 122/14.31 |
| 6,311,897 B1 * | 11/2001 | Zeitzschel | | 236/101 D |
| 6,360,956 B1 * | 3/2002 | Taylor et al. | | 236/12.2 |
| 6,371,030 B1 * | 4/2002 | Gilman et al. | | 102/529 |
| 6,536,464 B1 * | 3/2003 | Lum et al. | | 137/337 |
| 6,574,958 B1 * | 6/2003 | MacGregor | | 60/527 |
| 6,792,976 B2 * | 9/2004 | Butera et al. | | 137/831 |
| 6,840,257 B2 * | 1/2005 | Dario et al. | | 137/9 |
| 6,843,465 B1 * | 1/2005 | Scott | | 251/129.06 |
| 6,915,926 B2 * | 7/2005 | Naik | | 222/146.6 |
| 7,198,059 B2 * | 4/2007 | Kempf | | E03B 1/048 |
| | | | | 137/269 |
| 7,198,248 B2 * | 4/2007 | Butera et al. | | 251/11 |
| 7,392,955 B1 * | 7/2008 | Laing | | 236/12.13 |
| 7,597,215 B2 * | 10/2009 | Sleiman | | 222/65 |
| 7,731,097 B2 * | 6/2010 | Honeychurch et al. | | 236/12.19 |
| 7,740,183 B2 * | 6/2010 | Knapp | | 236/12.2 |
| 7,748,405 B2 * | 7/2010 | Ghorbal et al. | | 137/596.17 |
| 7,815,161 B2 * | 10/2010 | Saitoh et al. | | 251/11 |
| 7,819,332 B2 * | 10/2010 | Martin et al. | | 236/34.5 |
| 7,832,421 B2 * | 11/2010 | Laing | | 137/337 |
| 7,874,498 B2 * | 1/2011 | Kempf | | E03B 7/045 |
| | | | | 236/12.13 |
| 8,083,209 B2 * | 12/2011 | Kozdras et al. | | 251/337 |
| 8,210,441 B2 * | 7/2012 | Kempf et al. | | 236/12.13 |
| 8,434,510 B2 * | 5/2013 | Lum et al. | | 137/337 |
| 8,499,779 B2 * | 8/2013 | Gillespie | | 137/15.18 |
| 2003/0106761 A1 * | 6/2003 | Taylor | | 192/41 R |
| 2003/0140966 A1 * | 7/2003 | Kempf et al. | | 137/337 |
| 2004/0232249 A1 * | 11/2004 | Brown et al. | | 236/34.5 |
| 2005/0005634 A1 * | 1/2005 | Eberhardt et al. | | 62/498 |
| 2005/0005980 A1 * | 1/2005 | Eberhardt et al. | | 137/872 |
| 2005/0173661 A1 * | 8/2005 | Mignon | | F16K 31/002 |
| | | | | 251/11 |
| 2006/0042470 A1 * | 3/2006 | Anson | | A47J 31/46 |
| | | | | 99/275 |
| 2006/0049267 A1 * | 3/2006 | Lum et al. | | 236/12.13 |
| 2006/0071088 A1 * | 4/2006 | Adams et al. | | 236/50 |
| 2006/0124758 A1 * | 6/2006 | Sansum et al. | | 236/12.11 |
| 2006/0230772 A1 * | 10/2006 | Wacknov et al. | | 62/199 |
| 2007/0137709 A1 * | 6/2007 | Kempf et al. | | 137/337 |
| 2007/0170273 A1 * | 7/2007 | McIllwain | | 237/19 |
| 2007/0295016 A1 * | 12/2007 | Robin | | 62/224 |
| 2008/0035209 A1 * | 2/2008 | Negishi et al. | | 137/88 |
| 2008/0053125 A1 * | 3/2008 | Satake et al. | | 62/222 |
| 2008/0066807 A1 * | 3/2008 | Seki | | 137/114 |
| 2008/0105305 A1 * | 5/2008 | Lum et al. | | 137/337 |
| 2008/0223451 A1 * | 9/2008 | Acker | | 137/337 |
| 2008/0307786 A1 * | 12/2008 | Hafez et al. | | 60/527 |
| 2010/0108713 A1 * | 5/2010 | Grossbach et al. | | 222/1 |
| 2010/0213401 A1 * | 8/2010 | Martin et al. | | 251/321 |
| 2010/0314457 A1 * | 12/2010 | Todaka et al. | | 236/12.16 |
| 2010/0331853 A1 * | 12/2010 | Garcia et al. | | 606/110 |
| 2011/0259472 A1 * | 10/2011 | Clark | | F24D 19/1051 |
| | | | | 141/83 |
| 2011/0315903 A1 * | 12/2011 | Sohn | | F03G 7/065 |
| | | | | 251/11 |
| 2012/0325918 A1 * | 12/2012 | Kempf et al. | | 236/12.13 |
| 2013/0180611 A1 * | 7/2013 | Lum et al. | | 137/625.4 |

FOREIGN PATENT DOCUMENTS

| | | |
|---|---|---|
| FR | 2620324 | 3/1989 |
| JP | 2005316560 | 11/2005 |
| JP | 2007162984 | 6/2007 |
| JP | 2008264486 | 11/2008 |
| JP | 04529531 | 8/2010 |
| WO | 94/00045 | 1/1994 |
| WO | 2009/000859 | 12/2008 |

OTHER PUBLICATIONS

PCT International Search Report mailed on Feb. 11, 2013 for PCT Application PCT/IB2012/056492 filed on Nov. 16, 2012 in the name of SAES Getters S.P.A.
PCT Written Opinion mailed on Feb. 11, 2013 for PCT Application PCT/IB2012/056492 filed on Nov. 16, 2012 in the name of SAES Getters S.P.A.

* cited by examiner

MULTI-BEVERAGE VENDING MACHINE

CROSS REFERENCE TO RELATED APPLICATIONS

The present application is the US national stage of International Patent Application PCT/IB2012/056492 filed on Nov. 16, 2012 which, in turn, claims priority to Italian Patent Application MI2010A002121 filed on Nov. 22, 2011.

The present invention relates to a multi-beverage vending machine that includes a water supply system for obtaining mixed warm water with a temperature selected among a set of pre-determined temperatures comprised between an upper and a lower value corresponding to the temperatures of the hot water and the cold water to be mixed. In this multi-beverage vending machine the warm water obtained with this water supply system is used for preparing an instant drink. In the following, the terms multi-beverage vending machine and instant drink vending machine will be both used as alternative expressions to describe the same machine.

Multi-beverage vending machines are widely used and present in most public places or work sites. These vending machines are designed to prepare a wide range of different beverages, for example coffee, tea, chocolate, milk, etc. The beverage preparation essentially consists in supplying warm water from a water heater to obtain the desired kind of drink by percolation (in the case of coffee) or by solubilisation of instant powder ingredients (in the case of most beverages other than coffee).

For example, the Japanese patent published as JP04529531, in the name of Fuji Denki Reiki KK, discloses a vending machine containing hot water stored in a vacuum insulated heater. Hot water is supplied by two or more different outlets, each one connected to an existing mixing bowl present in the vending machine. Each mixing bowl is used to mix only one kind of soluble powder product useful for the preparation of a selected beverage.

A good control of the warm water temperature is very important for assuring a final good quality beverage, since the ideal temperature of the warm water changes if it is to be used in a percolation process or in a solubilisation process and, in the second case, in relation to the specific instant powder ingredients loaded in the vending machine. Therefore some efforts have been recently done in order to improve this control.

Even if it improves the control of the water temperature while minimizing the heater power consumption, the hot water supply apparatus described in JP04529531 is focused on the control of only one temperature value (i.e. the temperature of the water contained in the heater) and therefore it does not teach how to tailor the water temperature to the optimal value for each mixing bowl, in relation to the different soluble powder product used therein.

An alternative known solution is disclosed in the Japanese patent application published as JP2008264486, in the name of Fuji Electric Retail Systems. It consists in using two or more water heaters, each set to operate at a desired temperature. This is a very simple solution but it has some drawbacks. In fact, if the system has two heaters, it clearly implies a doubling of the manufacturing cost, a size increase and a high power consumption during its operation.

In fact the use of a single heater is preferred by vending machine producers. In this case, for example, the heater is set at the temperature required for coffee preparation (i.e. 100-120° C. if percolation is used) and it has multiple outlets, one for the coffee and at least one for beverages that require solubilisation of powder ingredients. The hot water is used "as is" for coffee preparation whereas it is mixed with cold water coming from the water mains supply (i.e. the aqueduct line) for preparation of soluble drinks like tea, milk, chocolate as so on.

The hot and cold water mixing is obtained by the use of a multichannel mixing tube, known as a "pivot tube", collecting water coming from the outlets of the heater and from the water mains supply and the mixed water is released from this pivot tube through one of the electro-valves present on it. When a specific kind of beverage is selected, the corresponding electro-valve is opened and the water can be directed to the suitable mixing for percolating) bowl. The main drawback of this solution is the poor control of the outcoming water temperature due to the great variability of the temperature of the cold water coming from the aqueduct line, that can be comprised in the 5-40° C. range.

The object of the present invention is to overcome the drawbacks of known art apparatuses, i.e. to provide an instant drink vending machine comprising a water supply system suitable to obtain an effective temperature control on the supplied water.

The invention consists in an instant drink vending machine that includes a water supply system comprising a connection to the water mains supplying water at a temperature $T_1$, a heater supplying hot water at a temperature $T_2$ higher than $T_1$ and having at least two outlets controlled by valves for releasing water from it, and at least one thermostatic shape memory alloy device having a first water inlet coupled to the connection to the water mains, a second water inlet connected to one of the heater outlets and an outlet supplying water at a selected temperature $T_3$ comprised in the range between $T_1$ and $T_2$.

Figure 2:
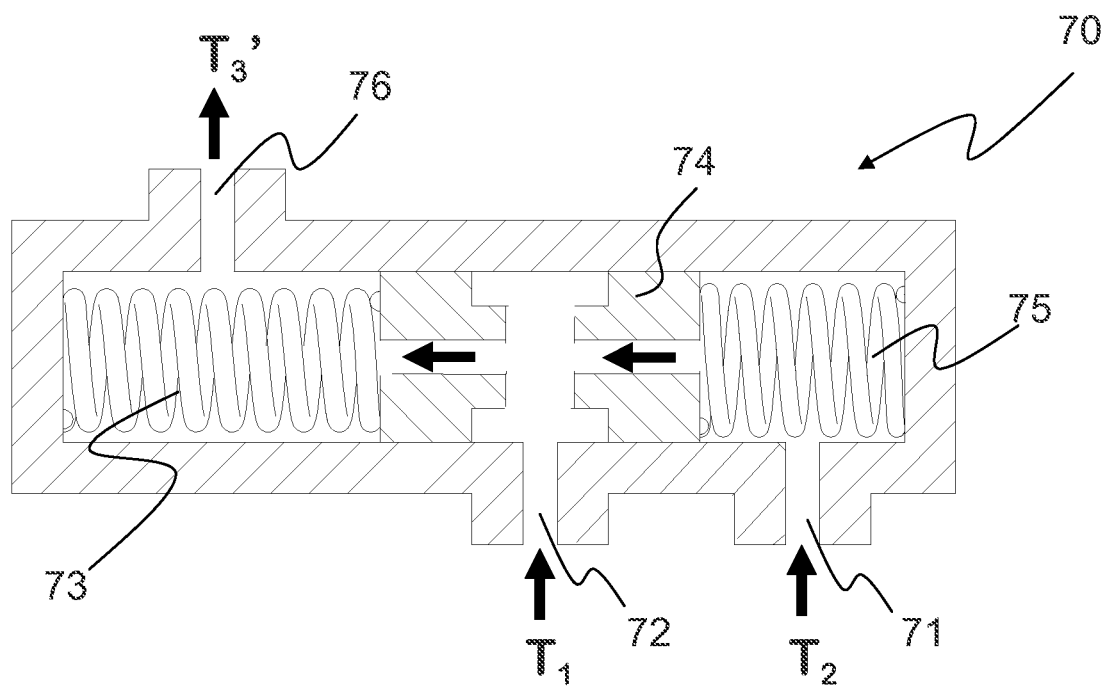
Figure 3:
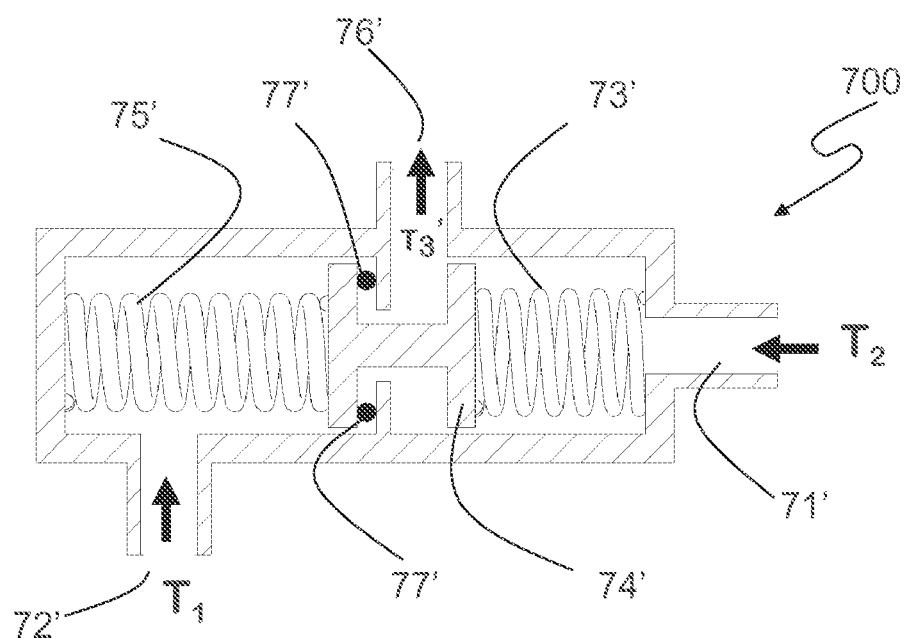
Figure 4:
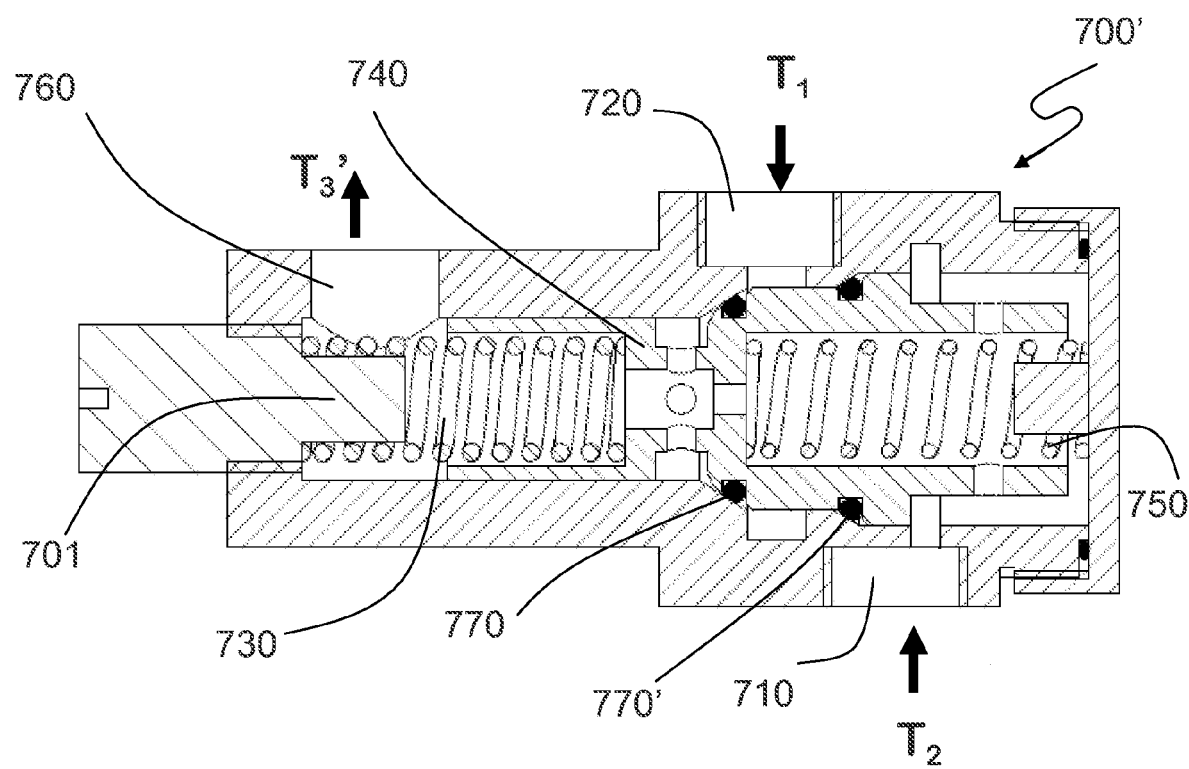

The invention will be further described with reference to the following figures:

FIG. 1 shows an exemplifying scheme of a water supply system for an instant drink vending machine according to the present invention, FIG. 2 shows an exemplifying scheme for a cross-section of a thermostatic shape memory alloy device suitable to be used in a water supply system for an instant drink vending machine as represented in FIG. 1, FIG. 3 shows an exemplifying scheme for a cross-section of a thermostatic shape memory alloy device according to an alternate embodiment and suitable to be used in a water supply system for an instant drink vending machine as represented in FIG. 1, and FIG. 4 shows a cross-section of a preferred embodiment of a thermostatic shape memory alloy device suitable to be used in a water supply system for an instant drink vending machine as represented in FIG. 1.

In the above figures the dimensions and the dimensional ratios of the represented elements may not be in the proper scale or ratio, but in some cases have been altered for the sake of clarity of the drawing.

The water supply system 100 of an instant drink vending machine according to the present invention is shown in FIG. 1 in an exemplifying scheme useful for a three-beverage vending machine, i.e. coffee and two different soluble drinks. A heater 10 is supplied with cold water at a temperature $T_1$ coming from the water mains supply tube 20 through a duct 30. The heater 10 supplies water at a temperature $T_2$ higher than $T_1$ and required for the preparation of the beverage requiring the highest temperature among the beverages selectable in a vending machine (beverage at highest temperature). When needed, the hot water is released using ducts

50, 50', 50" through one of the controlling valves 40, 40', 40". Preferably the controlling valves 40, 40', 40" are placed at the outlets of heater 10.

If the beverage at highest temperature has to be prepared, hot water is supplied "as is" (i.e. $T_1=T_2$) to the percolation or mixing bowl through valve 40 and duct 50. If lowering of the temperature is required, the hot water released through one of the controlling valves 40', 40" is supplied through the relevant ducts 50', 50" to a thermostatic shape memory alloy device 70, 70' where the water at temperature $T_2$ is mixed with cold water (at temperature $T_1$) that is supplied through relevant connection ducts 60, 60' to the public supply tube 20. The mixed water at the desired temperature $T_3'$ or $T_3''$, where $T_3'$ and $T_3''$ are different temperatures in the range between $T_1$ and $T_2$, is then supplied to the suitable mixing bowl by means of relevant ducts 80, 80'.

The water supply system 100 of FIG. 1 is just an exemplary and preferred embodiment according to the present invention, that might also encompass equivalent variants. For example the connection ducts 60 and 60' may be replaced by a single delivering pipeline, similar considerations apply also to ducts 50, 50', 50", i.e. the same duct may supply more thermostatic shape memory alloy devices.

Also other common variations are inherent to the structure of heater 10, that in FIG. 1 has been depicted as having a tank form and structure, but it could also be a headed pipe or a heating element such as a serpentine, suitably powered and controlled, in the water flow path.

The expression "thermostatic shape memory alloy device" is meant to indicate a thermostatic device using a shape memory alloy element as a temperature responding and actuating element.

Shape memory alloys are commonly known in the field with the acronym "SMA". Although various composition of SMAs are known, the most used in practice are those based on a Ni—Ti composition, meaning that nickel and titanium are at least 70 wt % of the alloy, the most common being a composition preferably comprising from 54 to 55.5% by weight of nickel, balance titanium (traces of other components are possible, typically their overall content being less than 1 wt %).

Also other useful alloys envision the addition of amounts of one or more other elements. In this regards other alloys appreciated in the field are Ni—Ti—Cu alloys, such as the alloys described in U.S. Pat. No. 4,144,057.

It is known that a mechanical part made of a Ni—Ti alloy is capable of interchanging between two shapes, as a consequence of a change in temperature that causes a phase transition in the alloy microstructure. The stable phase at higher temperatures is called austenite, while the stable phase at lower temperatures is called martensite. The transformation between the two phases occurs according to a hysteresis cycle in a temperature-deformation diagram, characterized by four temperature values: when heating, starting from low temperatures at which the martensitic phase is stable, a temperature As is reached at which the transformation into the austenitic phase begins, then a temperature Af (Af>As) is reached at which the transformation into austenite is complete; when cooling, starting from a temperature at which the austenitic phase is stable, a temperature Ms is reached at which the transformation into the martensitic phase begins, thereafter a temperature Mf (Mf<Ms) is reached at which such a transformation is complete.

In one of the most common configurations, the SMA elements are used in the form of coiled wires to form springs, since it is one of the most useful configurations to exploit the force resulting in a SMA alloy transition change that results in a variation of the length of the SMA element. Also, the application of a load to a shape memory element, such as in the spring-like configuration, makes it possible to shift and alter its working temperature as described in the international patent application number WO 2009/000859 in the applicant's name by altering the applied load or, as it is commonly defined, bias. This mechanism can therefore be used as a setting means for the temperature of the mixed water.

FIG. 2 shows an exemplifying scheme of the cross-section of a thermostatic shape memory alloy device 70 suitable to be inserted in a water supply system of an instant drink vending machine according to the present invention. The device has a first inlet 71 connected to an outlet of heater 10, through duct 50', and a second inlet 72 connected to the water mains supply through duct 60. A shape memory alloy spring 73 and a movable element 74 are present in the device. The actual position of this movable element 74 is the result of the forces applied thereto by the shape memory alloy spring 73 and a biasing element 75, and in normal operation its rest positioning is determined by the balance of the forces exerted by the shape memory alloy spring 73 and the biasing spring 75.

Since the shape memory alloy spring 73 undergoes the austenitic phase transition when hot water at a temperature $T_2$, higher than the shape memory transition temperature As, is flowing through the first inlet 71, this causes the shifting of the movable element 74 to the position shown in FIG. 2, allowing the inflow of cold water at temperature $T_1$ through the second inlet 72 in an amount suitable to reach the desired temperature $T_3'$ for the water coining out through the outlet 76 of the device.

It should be noted that using thermostatic shape memory alloy devices to regulate the water temperatures in vending machines is particularly advantageous thanks to the above-mentioned hysteresis cycle that allows to set the temperature of the beverages in a narrow interval (that is a function of the width of the hysteresis cycle). This simplifies the system and also avoids a continuous regulation, since the thermostatic SMA device will make adjustments, by means of a property of the used material, only when the temperature is outside the required range determined by the hysteresis curve of the material and by the applied bias, thus achieving a discrete regulation that poses less stress on the system (a lower number of actuations) and does not consume energy to be carried out. So a passive smart system operating only when necessary is obtained.

FIG. 3 shows an exemplifying scheme of the cross-section of an alternate embodiment of a thermostatic shape memory alloy device 700 suitable to be inserted in a water supply system of an instant drink vending machine according to the present invention. Also in this case the shape memory element, in the form of a sprint 73', is in direct contact with inlet 71' connected with the outlet of heater 10 though duct 50', while a biasing element, in the form of a spring 75', is in direct contact with a second inlet 72' connected to the water mains supply through duct 60. The shape memory device 700 contains also a movable element 74' whose actual position is the result of the forces applied thereto by the shape memory element 73' and the biasing element 75'.

This embodiment also includes a sealing O-ring 77' that seals the part of the movable element 74' in contact with the water mains supply. This arrangement allows for the shape memory device itself to control the cold water inlet, without the need of an electrically operated valve installed on the water mains supply tube.

In this shape memory alloy device, the mixing of water at different temperatures is enabled only when hot water at a temperature $T_2$ enters device 700 through inlet 71' whereby due to the force exerted by the shape memory transition of element 73', that shifts to the left the movable element 74' by a suitable amount, the cold water entering through inlet 72' mixes with the hot water to reach the desired temperature $T_3'$ for the water coming out through the outlet 76' of the device.

It has been observed that with the instant drink vending machine according to the present invention there is a lesser consumption of hot water that may be up to 30% for drinks made by mixing water at different temperatures, leading to a corresponding lesser power consumption for heater 10.

As a secondary aspect and further advantage, the improvement allowed by the present invention consists in the possibility to easily and finely adjust the temperature $T_3'$ for minor changes in relation to the current season: in fact lowering the beverage temperature during the summer with respect to the winter can increase its appreciation by the final consumer.

This may be done by means of a biasing load as described in the above mentioned international patent application number WO 2009/000859.

This type of arrangement is present in the cross-sectional representation of a preferred embodiment of a thermostatic shape memory alloy device shown in FIG. 4. In this case, the thermostatic shape memory alloy device 700' includes load-adjustment means 701 coupled with the shape memory alloy spring 730, in addition to a biasing element 750, e.g. a spring. The balance between the force of the shape memory alloy spring 730 and the force of the biasing spring 750 determines the position of the movable element 740 that, when the temperature of the water flowing into device 700' is higher than the alloy transition temperature (keeping into account its shift due to the biasing load), moves to the right as a consequence of the SMA transition causing the SMA spring to elongate. Due to the displacement of element 740, inlet 720 for the water mains supply is aligned with the central aperture of the movable element 740, therefore allowing the mixing of the low temperature water at temperature $T_1$ with the high temperature water coming from inlet 710 at temperature $T_2$. Such mixing determines the temperature $R_3'$ of the water leaving through outlet 760.

In the embodiment shown in FIG. 4, inlets 710 and 720 are formed on opposite sides of the thermostatic device 700' and both receive water, at different temperatures, in correspondence of the biasing spring 750. This provides the advantage of a more uniform mixing between the hot and cold water and a more stable operation of the device (the black circles 770, 770' indicate O-rings that improve the sealing of the movable element 740 against water leaks).

The above described thermostatic shape memory alloy devices are the preferred and more useful configurations apt, to be inserted into water distribution systems of an instant drink vending machine, even though other configurations of the thermostatic shape memory alloy devices may be suitably used and are encompassed by the present invention, such as, for example, thermostatic devices using two shape memory alloy springs placed adjacent one to the other.

The instant drink vending machine according to the present invention can be obtained also by retrofitting existing vending machines, such retrofitting being performed by simply adding one or more shape memory alloy mixing devices and by making the necessary branching of the water supply pipes.

The invention claimed is:

1. An instant drink vending machine comprising:
  a water supply system comprising a connection to a water main supplying water at a first temperature lower than 100° C., the water supply system including
    a heater supplying hot water at a second temperature higher than said first temperature and comprised between 100° C. and 120° C., said heater further having at least two heater outlets controlled by valves, the heater being supplied with water at the first temperature from the water main, and
    at least one thermostatic shape memory alloy device having a first water inlet connected to one of the valves controlling one of said at least two heater outlets, a second water inlet connected to the water supply system, and an outlet supplying water at a first selected temperature comprised in a range between the first temperature and the second temperature and less than 100° C., said at least one thermostatic shape memory alloy device comprising a shape memory alloy spring made of a Ni—Ti based alloy containing at least 70% wt of Nickel and Titanium,
  a first vending outlet connected to one of the at least two heater outlets, the first vending outlet providing water at the second temperature for preparation of a first instant drink, and
  a second vending outlet connected to the at least one thermostatic shape memory alloy device supplying water at the first selected temperature for preparation of a second instant drink by mixing water at the first temperature with water at the second temperature.

2. The instant drink vending machine according to claim 1, wherein said valves are placed on the at least two heater outlets.

3. The instant drink vending machine according to claim 1, wherein said at least one thermostatic shape memory alloy device comprises a first thermostatic shape memory alloy device and a second thermostatic shape memory alloy device, and wherein the heater has three heater outlets, and wherein the second vending outlet is connected to the first thermostatic shape memory allow device.

4. The instant drink vending machine according to claim 3, wherein each of the first thermostatic shape memory alloy device and the second thermostatic shape memory alloy device has a first dedicated duct for receiving water at the second temperature from the heater and a second dedicated duct for receiving water at the first temperature from the water main.

5. The instant drink vending machine according to claim 3, wherein the first thermostatic shape memory alloy device and the second thermostatic shape memory alloy device share at least one of: i) a common duct for receiving water at the second temperature from the heater and ii) a common duct for receiving water at the first temperature from the water main.

6. The instant drink vending machine according to claim 3, further comprising:
  a third vending outlet connected to the second thermostatic shape memory alloy device providing water at a second selected temperature lower than the first selected temperature for preparation of a third instant drink.

7. The instant drink vending machine according to claim 6, wherein:
  the first thermostatic shape memory alloy device comprises a first shape memory alloy spring made of a Ni—Ti based alloy containing at least 90 wt % of nickel and titanium with a composition of the Ni—Ti based alloy, and the first thermostatic shape memory alloy device comprises a first biasing spring providing a first load for the first shape memory alloy spring chosen so as to provide the first selected temperature lower than the second temperature at its outlet, and
  the second thermostatic shape memory alloy device comprises a second shape memory alloy spring made of a Ni—Ti based alloy containing at least 90 wt % of nickel and titanium with a composition of the Ni—Ti based alloy, and the second thermostatic shape memory alloy device comprises a second biasing spring providing a second load for the second shape memory alloy spring chosen so as to provide the second selected temperature lower than the first selected temperature at its outlet.

8. The instant drink vending machine according to claim 3, wherein:
the first thermostatic shape memory alloy device comprises a first shape memory alloy spring made of a Ni—Ti based alloy containing at least 90 wt % of nickel and titanium with a composition of the Ni—Ti based alloy, and the first thermostatic shape memory alloy device comprises a first biasing spring providing a first load for the first shape memory alloy spring chosen so as to provide the first selected temperature lower than the second temperature at its outlet, and
the second thermostatic shape memory alloy device comprises a second shape memory alloy spring made of a Ni—Ti based alloy containing at least 90 wt % of nickel and titanium with a composition of the Ni—Ti based alloy, and the second thermostatic shape memory alloy device comprises a second biasing spring providing a second load for the second shape memory alloy spring chosen so as to provide a second selected temperature lower than the first selected temperature at its outlet.

9. The instant drink vending machine according to claim 1, wherein said Ni—Ti based alloy contains at least 99% of nickel and titanium.

10. The instant drink vending machine according to claim 1, wherein said Ni—Ti based alloy contains also copper.

11. The instant drink vending machine according to claim 1, wherein the at least one thermostatic shape memory alloy device further comprises a biasing element and a movable element with an aperture, said movable element being arranged between said biasing element and the shape memory alloy spring, wherein in a first equilibrium position said aperture of the movable element is in communication with a duct supplying water at the first temperature via the second water inlet and in a second equilibrium position the movable element isolates the thermostatic shape memory alloy spring from said duct.

12. The instant drink vending machine according to claim 11, wherein both the first and second water inlets are located in correspondence with the biasing element.

13. The instant drink vending machine according to claim 11, wherein the first water inlet is located in correspondence of the shape memory alloy spring and the second water inlet is located in correspondence with the biasing element.

14. The instant drink vending machine according to claim 1, wherein the at least one thermostatic shape memory alloy device further comprises load-adjustment means coupled with the shape memory alloy spring so as to provide an additional and selectable bias that remains constant during an operation of the at least one thermostatic shape memory alloy device.

* * * * *